(12) United States Patent
Rowley et al.

(10) Patent No.: US 9,321,239 B2
(45) Date of Patent: Apr. 26, 2016

(54) DIRECT LASER-ENGRAVEABLE PATTERNABLE ELEMENTS AND USES

(71) Applicants: Lawrence A. Rowley, Rochester, NY (US); Christine J. Landry-Coltrain, Fairport, NY (US)

(72) Inventors: Lawrence A. Rowley, Rochester, NY (US); Christine J. Landry-Coltrain, Fairport, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 753 days.

(21) Appl. No.: 13/627,140

(22) Filed: Sep. 26, 2012

(65) Prior Publication Data

US 2014/0087077 A1    Mar. 27, 2014

(51) Int. Cl.
| | | |
|---|---|---|
| *B32B 3/10* | (2006.01) | |
| *B32B 27/36* | (2006.01) | |
| *B41C 1/05* | (2006.01) | |
| *B41N 1/12* | (2006.01) | |
| *B32B 7/12* | (2006.01) | |
| *B32B 27/08* | (2006.01) | |
| *B32B 27/20* | (2006.01) | |
| *B32B 27/32* | (2006.01) | |
| *B23K 26/40* | (2014.01) | |

(52) U.S. Cl.
CPC ................ *B32B 3/10* (2013.01); *B23K 26/402* (2013.01); *B32B 7/12* (2013.01); *B32B 27/08* (2013.01); *B32B 27/20* (2013.01); *B32B 27/32* (2013.01); *B32B 27/36* (2013.01); *B41C 1/05* (2013.01); *B41N 1/12* (2013.01); *B23K 2203/42* (2015.10); *B32B 2264/108* (2013.01); *B32B 2274/00* (2013.01); *B32B 2307/4026* (2013.01); *Y10T 428/24479* (2015.01); *Y10T 428/24612* (2015.01); *Y10T 428/24802* (2015.01); *Y10T 428/31786* (2015.04)

(58) Field of Classification Search
CPC .............. B41N 1/05; Y10T 428/24802; Y10T 428/31786; Y10T 428/24479; Y10T 428/24612; B32B 3/10; B32B 7/12; B32B 27/08; B32B 27/32; B32B 27/20; B32B 27/36; B32B 2264/108; B32B 2274/00; B32B 2307/4026
See application file for complete search history.

(56) References Cited

U.S. PATENT DOCUMENTS

| | | | |
|---|---|---|---|
| 4,613,533 A | | 9/1986 | Loomis et al. |
| 4,739,012 A | | 4/1988 | Hagman |
| 4,934,267 A | | 6/1990 | Hashimoto et al. |
| 5,719,009 A | * | 2/1998 | Fan ............................. 430/306 |
| 5,798,202 A | | 8/1998 | Cushner et al. |
| 5,857,241 A | * | 1/1999 | Camp et al. ..................... 16/436 |
| 6,223,655 B1 | | 5/2001 | Shanbaum et al. |
| 6,287,411 B1 | * | 9/2001 | Kelley et al. .................. 156/327 |
| 7,282,242 B2 | | 10/2007 | Abell, III et al. |
| 8,114,572 B2 | | 2/2012 | Landry-Coltrain et al. |
| 2006/0258796 A1 | * | 11/2006 | Boogh et al. .................. 524/502 |
| 2008/0233280 A1 | | 9/2008 | Blanchet et al. |
| 2010/0143841 A1 | | 6/2010 | Stolt et al. |

OTHER PUBLICATIONS

L. A. Rowley, et al., "Method for Providing Patterns of Functional Materials", U.S. Appl. No. 13/627,163, filed Sep. 26, 2012.

\* cited by examiner

*Primary Examiner* — Donald J Loney
(74) *Attorney, Agent, or Firm* — J. Lanny Tucker

(57) ABSTRACT

A laser-engravable patternable element can be used to provide a relief image for various types of printing including flexographic printing. This laser-engraveable patternable element has a one laser-engravable layer that comprises a thermoplastic elastomeric interpolymer alloy that comprises a non-crosslinked halogenated polymer, a partially crosslinked polyolefin, and a polyester. A relief image can be obtained by directly laser-engraving the noted element under suitable conditions.

15 Claims, No Drawings

DIRECT LASER-ENGRAVEABLE PATTERNABLE ELEMENTS AND USES

RELATED APPLICATION

Reference is made to copending and commonly assigned U.S.S.N. 13/627,163 filed on Sep. 26, 2012, by Rowley and Landry-Coltrain, and entitled METHOD FOR PROVIDING PATTERNS OF FUNCTIONAL MATERIALS.

FIELD OF THE INVENTION

This invention relates to direct laser-imageable (laser-engraveable) patternable elements including laser-engraveable flexographic printing precursors. These laser-engraveable patternable elements comprise a unique laser-engraveable layer. This invention also relates to methods of preparing these direct laser-engraveable patternable elements and to methods of using these direct laser-engraveable patternable elements to provide relief images in various patterned articles.

BACKGROUND OF THE INVENTION

Relief images can be provided and used in various articles for many different purposes. For example, the electronics, display, and energy industries rely on the formation of coatings and patterns of conductive materials to form circuits on organic and inorganic substrates. Such coatings and patterns are often provided using relief imaging methods and relief image forming elements. There is also need for means to provide fine wiring in various articles.

Microelectronic devices have been prepared by photolithographic processes to form necessary patterns. Photolithography, however, if a complex, multi-step process that is too costly for the printing of plastic electronics.

Contact printing is a flexible, non-lithographic method for forming patterned materials. Contact printing potentially provides a significant advance over conventional photolithographic techniques since contact printing can form relatively high resolution patterns on plastic electronics for electronic parts assembly. Microcontact printing can be characterized as a high resolution technique that enables patterns of micrometer dimensions to be imparted onto a substrate surface. Contact printing is a possible replacement for photolithography in the fabrication of microelectronic devices, such as radio frequency tags (RFID), sensors, and memory and back panel displays. The capability of microcontact printing to transfer a self-assembled monolayer (SAM) forming molecular species to a substrate has also found application in patterned electroless deposition of metals. SAM printing is capable of creating high resolution patterns, but is generally limited to forming metal patterns of gold or silver for example using thiol chemistry. Although there are variations, in SAM printing a positive relief pattern provided on an element having a relief image is inked onto a substrate.

Flexography is a method of printing that is commonly used for high-volume printing runs. It is usually employed for printing on a variety of soft or easily deformed materials including but not limited to, paper, paperboard stock, corrugated board, polymeric films, fabrics, metal foils, glass, glass-coated materials, flexible glass materials, and laminates of multiple materials. Coarse surfaces and stretchable polymeric films are economically printed using flexography.

Flexographic printing members are sometimes known as "relief" printing members (for example, relief-containing printing plates, printing sleeves, or printing cylinders) and are provided with raised relief images onto which ink is applied for application to a printable material. While the raised relief images are inked, the relief "floor" should remain free of ink. The flexographic printing precursors are generally supplied with one or more imageable layers that can be disposed over a backing layer or substrate. Flexographic printing also can be carried out using a flexographic printing cylinder or seamless sleeve having the desired relief image.

Flexographic printing members can be provided from flexographic printing precursors that can be imaged flat or "in-the-round" (ITR) using either a photomask or laser-ablatable mask (LAM) over a photosensitive composition (layer), or they can be imaged by direct laser engraving (DLE) of a laser-engraveable composition (layer) that is not necessarily photosensitive.

Gravure or intaglio printing members are also relief printing members in which the image to be printed comprises depressions or recesses on the surface of the printing member, where the printing area is localized to the areas of depression that define the pattern or image. The process for using gravure or intaglio printing members is the reverse of flexographic relief printing wherein an image is raised above the floor of the flexographic printing member and the printing area is localized at the contact area of the top surface protrusions.

Laser ablation or laser engraving can be used effectively with an appropriate laser-engraveable precursor to form images for either of the above-mentioned printing processes.

Flexographic printing precursors having laser-ablatable layers are described for example in U.S. Pat. No. 5,719,009 (Fan) where precursors include a laser-ablatable mask layer over one or more photosensitive layers. This publication teaches the use of a developer to remove non-reacted material from the photosensitive layer, the barrier layer, and non-ablated portions of the mask layer.

There has been a desire in the industry for a way to prepare flexographic printing members without the use of curable photosensitive layers that require liquid processing to remove non-imaged composition and mask layers and that generate significant amount of liquid waste. Direct laser engraving of precursors to produce relief printing plates and stamps is known, but the need for relief image depths greater than 500 µm creates a considerable challenge when imaging speed is also an important commercial requirement. In contrast to laser ablation of mask layers that require low to moderate energy lasers and fluence, direct engraving of a relief-forming layer requires much higher energy and fluence. A direct laser-engraveable layer must also exhibit appropriate physical and chemical properties to achieve "clean" and rapid laser engraving (high sensitivity) so that the resulting printed images have excellent resolution and durability.

A number of elastomeric systems have been described for construction of laser-engraveable flexographic printing precursors using various elastomeric rubber compositions in the laser-engraveable layers as described for example, in U.S. Pat. No. 6,223,655 (Shanbaum et al.), U.S. Pat. No. 4,934,267 (Hashimoto), and U.S. Pat. No. 5,798,202 (Cushner et al.). Although many polymers are suggested for this use in the literature, only extremely flexible elastomers have been used commercially because flexographic layers that are many millimeters thick must be designed to be bent around a printing cylinder and secured with temporary bonding tape and both must be removable after printing.

Thermoplastic elastomeric composition comprising partially crosslinked blends of ethylene copolymers and vinyl or vinylidene halide polymers are described in U.S. Pat. No. 4,613,533 (Loomis et al.), U.S. Pat. No. 4,739,012 (Hagman), and U.S. Pat. No. 7,282,242 (Abell, III, et al.).

The vulcanization of rubbers is a time-consuming, labor-intensive, multi-step process with significant batch-to-batch variations. Inconsistencies in curing and components lead to considerable waste in manufacturing, which brings increased costs and environmental problems. In addition, vulcanization requires the use of various sulfur or peroxide vulcanization agents, but such reactive compounds can produce objectionable odors. In general, the vulcanized compositions known in the art are non-processable, non-reshapeable, and non-recyclable.

Polyvinylchloride is a thermoplastic polymer but it has a glass transition temperature that is above ambient temperature and is therefore a rigid thermoplastic polymer and thus does not offer the flexibility, elongation, and compression recovery properties required for flexographic printing plates or other printing plates that need to be wrapped around a print cylinder. Polychloroprene (or neoprene) offers excellent compressibility and elongation, but it is a vulcanized (or crosslinked) rubber and therefore it is a thermoset polymer, which cannot be readily re-melted and reprocessed into another printing plate precursor.

There is a need to avoid the problems associated with conventional vulcanizing processes and to provide direct laser-engraveable compositions that are useful for providing relief images and that can be prepared with reduced material waste and even recycled for re-use.

SUMMARY OF THE INVENTION

This invention provides a laser-engravable patternable element for providing a relief image, the laser-engraveable patternable element comprising at least one laser-engravable layer that comprises a thermoplastic elastomeric interpolymer alloy that comprises:
    a non-crosslinked halogenated polymer,
    a partially crosslinked polyolefin, and
    a polyester.

In addition, the present invention provides a method for providing a relief image in a directly laser-engraved patterned element using direct laser engraving, the method comprising:
    imagewise exposing any embodiment of the laser-engraveable patternable element of the present invention to laser-engraving radiation to provide a directly laser-engraved patterned element having a relief image in the laser-engraveable layer.

For example, the method of this invention to provide a relief image in a flexographic printing member can comprise:
    laser-engraving any embodiment of the laser-engraveable patternable element of the present invention that is a flexographic printing precursor, to provide a flexographic printing member having a relief image in the laser-engraveable layer, the relief image having a minimum relief image depth of at least 30 µm.

The method of this invention can further comprise:
    using the directly laser-engraved patterned element (such as a flexographic printing member) to print an ink pattern (such as a flexographic ink image), for example by providing a flexographic printing member having the relief image in the laser-engraveable layer, and further comprising:
    using the flexographic printing member to print a flexographic ink image.

Moreover, the method can further comprise:
    applying an ink to the directly laser-engraved patterned element having a relief image that has a minimum relief image depth of at least 30 µm, to form an inked patterned element, and
    contacting the inked patterned element with a receiver element to form an ink image on the receiver element that corresponds to the relief image.

In some embodiments, the laser-engraveable patternable element is a gravure or intaglio printing precursor, and the method of this invention comprises:
    directly laser-engraving the laser-engraveable layer of the gravure or intaglio printing precursor to provide a recessed relief image having a minimum relief depth of at least 10 µm in the resulting laser-engraved gravure or intaglio printing member.

Moreover, the present invention provides a directly laser-engraved patterned element having a relief image provided by direct laser-engraving, the directly laser-engraved patterned element comprising a relief image that has a depth of at least 10 µm in a directly laser-engraved layer comprising a thermoplastic elastomeric interpolymer alloy comprising:
    a non-crosslinked halogenated polymer,
    a partially crosslinked polyolefin, and
    a polyester.

A system of this invention for directly laser-engraving a laser-engraveable patternable element to form a directly laser-engraved patterned member comprises:
    (1) a laser-engraveable patternable element for providing a relief image, the patternable element comprising at least one laser-engravable layer that comprises a thermoplastic elastomeric interpolymer alloy that comprises:
    a non-crosslinked halogenated polymer,
    a partially crosslinked polyolefin, and
    a polyester, and
    (2) one or more laser-engraving radiation sources that are directed to provide direct laser engraving of the laser-engraveable layer.

The laser-engravable patternable element of this invention provides a combination of desirable properties that are essential for high precision patterning or engraving using laser engraving. It is generally considered that a laser-engravable flexographic printing plate precursor must be cross-linked, hardened, or vulcanized in order to prevent the formation of melt edges during laser ablation (imaging) and to prevent excessive material swelling by printing inks during printing and by printing plate cleaning solvents.

It is a recognized problem that cross-linked, hardened, or vulcanized materials cannot easily be reprocessed, reformed, re-used, or recycled to their original material. It is also recognized that manufacturing difficulties, such as premature set-up, incomplete cure, and short pot-life, occur with the use of thermosetting elastomer precursors when preparing thick flexographic printing plates.

The composition used in the laser-engraveable layer according to this invention provides a solution to these problems. This laser-engraveable composition is totally melt-processable, unlike vulcanized rubbers that cannot be re-melted and processed and this allows for the laser-engraveable patternable element or material to be easily recycled into a new laser-engravable patternable element comprising the same laser-engraveable composition. The laser engraving of this composition during imaging provides excellent quality images with clean, precise features and no melt edges around the imaged features. It also provides surprisingly low debris accumulation and low sticking of the ablated debris onto the patterned element, which effects would result in image and print quality degradation. The laser-engraveable composition used according to this invention provides excellent laser-engraving efficiency, allowing for acceptable imaging throughput.

The laser-engraveable composition used according to this invention has excellent compressibility and elastomeric properties, similar to vulcanized rubbers, which properties are critical for flexographic printing. The laser-engraveable patternable elements of this invention can be readily embossed, with good release properties from the stamp or mold, to create a patterned surface that will enhance print quality, particularly in solids areas.

DETAILED DESCRIPTION OF THE INVENTION

Definitions

As used herein to define various components of the laser-engraveable compositions, formulations, and layers, unless otherwise indicated, the singular forms "a", "an", and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term's definition should be taken from a standard dictionary.

The use of numerical values in the various ranges specified herein, unless otherwise expressly indicated otherwise, are considered to be approximations as though the minimum and maximum values within the stated ranges were both preceded by the word "about". In this manner, slight variations above and below the stated ranges can be used to achieve substantially the same results as the values within the ranges. In addition, the disclosure of these ranges is intended as a continuous range including every value between the minimum and maximum values.

Unless otherwise indicated, percentages refer to percents by total dry weight, for example, weight % based on total solids of a layer, composition, or formulation. Unless otherwise indicated, the percentages can be the same for either the dry layer or the total solids of the formulation or composition used to make that layer.

In some embodiments, the term "imaging" refers to ablation of the background areas while leaving intact the areas of the laser-engraved patterned material that can be inked up and printed using a suitable ink, such as using a flexographic ink pattern with flexographic printing members.

Alternatively the term "imaging" refers to ablation of the image areas that can be inked up using a suitable ink (for printing) while leaving intact the areas of the laser-engraved patterned material that will not be printed, such as in gravure or intaglio printing members.

The term "flexographic printing precursor" refers to some embodiments of laser-engraveable patternable elements of this invention. The flexographic printing precursors include flexographic printing plate precursors, flexographic printing sleeve precursors, and flexographic printing cylinder precursors, all of which can be directly laser-engraved to provide a relief image using a laser according to the present invention to have a minimum relief image depth of at least 30 µm and up to and including 4000 µm, or at least 50 µm to and including 3000 µm. Such directly laser-engraveable, relief-forming precursors can also be known as "flexographic printing plate blanks", "flexographic printing cylinders", or "flexographic sleeve blanks". The laser-engraveable flexographic printing precursors can also have seamless or continuous forms.

The term "laser-engraveable" means that a layer can be directly imaged using a suitable laser-engraving source including carbon dioxide lasers and near-infrared radiation lasers such as Nd:YAG lasers, laser diodes, and fiber lasers. Absorption of energy provided by these lasers produces heat that causes rapid local changes in the laser-engraveable layer so that the imaged regions are physically detached from the rest of the layer or substrate and ejected from the layer and collected using suitable means. Non-imaged regions of the laser-engraveable layer are not removed or volatilized to an appreciable extent and thus form the upper surface of the relief image that is the patterned element printing surface for flexographic printing, for example, or non-printing surface for gravure or intaglio printing, for example. The breakdown is a violent process that includes eruptions, explosions, tearing, decomposition, fragmentation, oxidation, or other destructive processes that create a broad collection of solid debris and gases. This is distinguishable from, for example, image transfer. "Laser-ablative" and "laser-engraveable" can be used interchangeably in the art, but for purposes of this invention, the term "laser-engraveable" is used to define imaging in which a relief image is formed in the laser-engraveable layer. It is distinguishable from image transfer methods in which ablation is used to materially transfer pigments, colorants, or other image-forming components. The present invention relies on "direct" laser engraving of the relief-forming laser-engraveable layer, and it is distinguished from laser ablation of a thin layer to create a mask that is used to control the application of curing radiation to underlying layers and is removed prior to printing.

Unless otherwise indicated, the terms "laser-engraveable composition" and "laser-engraveable layer formulation" are intended to be the same.

The "top surface" is equivalent to the "relief-image forming surface" and is defined as the outermost surface of the laser-engraveable patternable element and is generally the first surface that is struck by imaging (engraving) radiation during the laser-engraving process. The "bottom surface" is defined as the surface of the laser-engraveable patternable element that is most distant from the imaging radiation.

As used herein, the term "recyclable" means that the laser-engraveable patternable element or laser-engraved patterned element can be reprocessed by melting and forming a new laser-engraveable patternable element with essentially the same laser-engraveable composition as the original. In the strictest sense, recycling of such a laser-engraveable material would produce a fresh supply of the same laser-engraveable material. It is understood, however, that for specific intended purposes, other additives can be also incorporated during the recycling process.

The term "electrically conductive ink" is mean to refer to a printable composition that either comprises at least one electrically conductive material, in dry or wet form, or comprises at least one material that can be treated to become electrically conductive.

Uses

The laser-engraveable patternable elements of this invention can be used in many ways. One use is as a flexographic printing precursor as described above. However, while the following disclosure is directed primarily to flexographic printing precursors, it is to be understood that the present invention is not so limited. For example, the laser-engraveable patternable elements can also be used as gravure or intaglio printing precursors to provide relief images for gravure printing, intaglio printing, or as other patternable elements to provide relief images or patterns useful in optical devices, electronic devices, display devices, or medical devices.

In addition, the laser-engraveable patternable elements can be used for contact printing to form a suitable pattern on a receiver element for use in devices and components in a variety of applications including but not limited to, electronic, optical, sensory, and diagnostic devices. More details of such uses are provided below.

Laser-Engraveable Patternable Elements

The laser-engraveable flexographic printing precursors (some embodiments of laser-engraveable patternable elements) are laser-engraveable to provide a desired relief image, and comprise at least one laser-engraveable layer that is formed from a laser-engraveable composition that comprises three essential components as a thermoplastic elastomeric interpolymer alloy: one or more non-crosslinked halogenated polymers, one or more partially crosslinked polyolefins, and one or more polyesters. These three essential components are described below as well as other optional components, and methods for formulating laser-engraveable layer compositions.

As used in this invention, the term "thermoplastic elastomeric interpolymer alloy" is defined as a mixture of two or more polymers that are not miscible but are compatible and for which the blending of these polymers creates a material that exhibits both thermoplastic properties and elastomeric properties. More precisely, a "thermoplastic elastomeric" is defined as a material, typically a polymer or copolymer, which exhibits both thermoplastic and elastomeric properties.

"Thermoplastic" refers to a polymer that becomes pliable or moldable above a specific temperature, and returns to a solid state upon cooling. "Elastomeric" refers to a polymer that shows elasticity which is a physical property of materials that return to their original shape after the stress that caused their deformation is no longer applied. Thus, thermoplastic elastomers exhibit rubber elasticity at ambient temperature and are fluidized by heating and thus are relatively easy to use in manufacturing, for example, by injection molding and extrusion.

"Interpolymer" indicates that two or more polymers are combined in a mixture to provide the "thermoplastic elastomeric" property.

"Alloy" is defined as a mixture of two or more materials (in this case polymers) in which the components are thermodynamically immiscible but totally compatible with each other and are mixed to create a new material containing multiple phases which exhibits macroscopically uniform physical properties. When a mixture of polymers is not compatible, it has poor physical and mechanical properties. Compatible mixtures show good physical and mechanical properties. Therefore the alloy mixture can be melted and reprocessed without changing the resulting morphology or phase composition of the mixture, or its physical properties. A more detailed description of these terms can be found in *Polymer Blends and Composites*, J. A. Manson and L. H. Sperling, Plenum Press, NY, 1976.

In general, the thermoplastic elastomeric interpolymer alloy used in the present invention has a softening temperature of less than or equal to 10° C., and typically less than or equal to 0° C., as measured using known procedures including the Vicat method (ASTM-D1525 or ISO 306), differential scanning calorimetry (DSC), dynamic mechanical analysis (DMA, DMTA), or thermal mechanical analysis (TMA).

Non-crosslinked halogenated polymers that are useful in the practice of the present invention include vinyl or vinylidene halide homopolymers or copolymers derived from one or more ethylenically unsaturated polymerizable monomers selected from the group consisting of vinyl esters, acrylonitrile, esters, styrene, acrylates, methacrylates, and vinyl ethers. Preferred polymers include poly(vinyl chloride), poly(vinylidene chloride), poly(vinyl bromide), and poly(vinyl fluoride), poly(vinylidene fluoride), and chlorinated poly(vinyl chloride).

The one or more non-crosslinked halogenated polymers are present in the laser-engraveable layer in a total amount of at least 5 weight % and up to and including 75 weight %, or typically of at least 5 weight % and up to and including 71 weight %, all based on the total dry weight of the laser-engraveable layer.

Useful partially crosslinked polyolefins are copolymers derived from ethylene or propylene with ethylenically unsaturated polymerizable co-monomers selected from classes of esters, vinyl esters, vinyl acrylates and vinyl methacrylates, vinyl acetate, vinyl alkyl ethers, vinyl or vinylidene halides, acrylonitrile, methacrylonitrile, norbornene, α-olefins and vinyl aromatic monomers, which are selected so that the resulting partially crosslinked polyolefin exhibits compatibility with the halogenated polymers described above. Other useful partially crosslinked polyolefins are described in U.S. Pat. No. 4,613,533 (Loomis et al.), U.S. Pat. No. 4,739,012 (Hagman), both incorporated herein by reference. The term "partially crosslinked" refers to a degree of crosslinking that is sufficient to produce an insoluble gel fraction between 5 weight % and 90 weight %.

The one or more partially crosslinked polyolefins are present in the laser-engraveable layer in a total amount of at least 5 weight % and up to and including 90 weight %, and typically at least 20 weight % and up to and including 80 weight %, all based on the total dry weight of the laser-engraveable layer.

In some embodiments, the weight ratio of the non-crosslinked halogenated polymer to the partially crosslinked polyolefin in the laser-engraveable layer is at least 0.05:1 to and including 3:1, or at least 0.2:1 to and including 2:1.

Useful polyesters are typically segmented co-polyesters derived from short or long chain ester units, derived from the reaction of glycols (diols) with dicarboxylic acid chains. Typical long chain glycols are poly(ethylene oxide)glycol, poly(1,2- and 1,3-propylene oxide)glycol, poly(tetramethylene oxide)glycol, random or block copolymers of ethylene oxide and 1,2-propylene oxide, and random or block copolymers of tetrahydrofuran with minor amounts of a second monomer such as 3-methyltetrahydrofuran. Typical short chain glycols include acrylic, alicyclic, and aromatic dihydroxy compounds, usually with molecular weights less than 550. Other useful polyesters are described in U.S. Pat. No. 4,739,012 (Hagman) that is incorporated herein by reference.

The one or more polyesters are present in the laser-engraveable layer in a total amount of at least 5 weight % and up to and including 90 weight %, and typically at least 5 weight % and up to and including 80 weight %, all based on the total dry weight of the laser-engraveable layer.

Other useful constituents of the thermoplastic elastomeric interpolymer alloy and laser-engraveable layer and methods by which they can be prepared are described in more detail in U.S. Pat. No. 4,613,533 (Loomis et al.) and U.S. Pat. No. 4,739,012 (Hagman) that are incorporated herein by reference. Other thermoplastic elastomeric interpolymer alloys useful for this invention are sold under the trade name Alcryn® melt processible rubbers (MPR), examples of which include but are not limited to, Alcryn® 1000 series BK, Alcryn® 2000 series BK (such as Alcryn® 2070BK and Alcryn® 2080BK), Alcryn® 2000 series CL, Alcryn® 2000 series NC, Alcryn® 3000 series NC, Alcryn® 4000 series BK (such as Alcryn® 4670BK), and Alcryn® 4000 series NC.

The laser-engraveable composition or layer can also comprise at least 0.5 weight % and up to and including 35 weight %, or typically at least 5 weight % and up to and including 30 weight %, of one or more near-infrared radiation absorbers (such as a carbon black), based on the total dry laser-engraveable composition or layer weight. The near-infrared (near-IR) radiation absorber is generally uniformly dispersed within the laser-engraveable composition.

In general, the laser-engraveable patternable element of this invention comprises a laser-engraveable layer that comprises a near-infrared radiation absorber in an amount of at least 0.5 weight %, which near-infrared radiation absorber is a carbon black, carbon nanotubes, an inorganic or organic pigment, an organic dye having at least one absorption peak wavelength of at least 700 nm and to and including 1400 nm, or a combination of any of these materials.

These near-infrared radiation absorbers facilitate or enhance laser engraving, and the near-infrared radiation absorbers have significant (perhaps maximum) absorption at peak wavelengths of at least 700 nm and higher in what is known as the near-infrared and infrared portion of the electromagnetic spectrum. In particularly useful embodiments, the near-infrared radiation absorber has at least one absorption peak $\lambda_{max}$ in the near-infrared portion of the electromagnetic spectrum of at least 700 nm or at least 800 nm and up to and including 1400 nm. In some embodiments, the near-infrared radiation absorber generally has an essentially panchromic absorption behavior that includes absorption in the near-infrared portion of the electromagnetic spectrum. Mixtures of near-infrared radiation absorbers can be used if desired, and the individual materials can have the same or different absorption spectra. The absorbance of the near-infrared radiation absorber can be matched to the particular laser-engraving radiation that is to be used.

Such near-infrared radiation absorbers can be a carbon black, graphene, carbon nanotubes, an organic or inorganic pigment, or an organic dye having at least one absorption peak wavelength of at least 800 nm, or mixtures or any combination of any of these materials. By "mixture", it is meant a plurality of each type of infrared radiation absorber. By "combination", it is meant at least one near-infrared radiation absorber of each type.

It is also possible that the near-infrared radiation absorber can be dispersed non-uniformly within the laser-engraveable layer, and is present in a concentration that is greater near the bottom surface of the laser-engraveable layer than the top surface. Further details of such arrangements are provided in U.S. Pat. No. 8,114,572 (Landry-Coltrain et al.) that is incorporated herein by reference.

Useful near-infrared radiation absorbers can be purchased from various commercial sources such as Cabot Corporation (Boston, Mass.), Orion Engineered Carbons (Kingwood, Tex.), Brewer Science, Inc. (Rolla, Mo.), and Graphene Industries Ltd. (Manchester, UK), or they are prepared using known procedures and commercially available starting materials.

In some embodiments, the laser-engraveable composition or layer can optionally include at least 1 weight % and up to and including 30 weight %, based on the total dry laser-engraveable composition or layer weight, of additional materials selected from the group consisting of hollow, solid, or porous particles, surfactants, plasticizers, lubricants (such as waxes), dyes, microspheres, and additional polymers, or combinations of these materials. Such additional polymers include elastomeric or non-elastomeric resins that are not any of the three essential components described above as forming the thermoplastic elastomeric interpolymer alloy.

For example, the laser-engraveable composition or layer can optionally include organic or inorganic filler materials selected from the group consisting of hollow, solid, or porous particles, surfactants, antioxidants, antiozonants, and microspheres. Useful inorganic fillers and other particles include but not limited to, various aluminas or silicas (treated, fumed, or untreated), calcium carbonate, magnesium oxide, talc, barium sulfate, kaolin, bentonite, hallosite and other clays, zinc oxide, zirconium oxide, mica, titanium dioxide, and mixtures thereof. Particularly useful inorganic fillers are silica, calcium carbonate, and alumina, such as fine particulate silica, fumed silica, porous silica, surface treated silica, sold as Aerosil® from Degussa, Utrasil® from Evonik, and Cab-O-Sil® from Cabot Corporation, micropowders such as amorphous magnesium silicate cosmetic microspheres sold by Cabot and 3M Corporation, calcium carbonate and barium sulfate particles and microparticles, zinc oxide, and titanium dioxide, or mixtures of two or more of these materials.

The laser-engraveable composition or layer can optionally comprise microcapsules that are dispersed generally uniformly within the laser-engraveable composition. These "microcapsules" can also be known as "hollow beads", "hollow spheres", "microspheres", microbubbles", "micro-balloons", "porous beads", or "porous particles". Some microcapsules include a thermoplastic polymeric outer shell and a core of either air or a volatile liquid such as isopentane or isobutane. The microcapsules can comprise a single center core or many voids (pores) within the core. The voids can be interconnected or non-connected. For example, microcapsules can be designed like those described in U.S. Pat. No. 4,060,032 (Evans) and U.S. Pat. No. 6,989,220 (Kanga), both of which are incorporated herein by reference, in which the shell is composed of a poly[vinylidene-(meth)acrylonitrile] resin or poly(vinylidene chloride), or as plastic micro-balloons as described for example in U.S. Pat. No. 6,090,529 (Gelbart) and U.S. Pat. No. 6,159,659 (Gelbart) that are incorporated herein by reference. Some useful microcapsules are the EXPANCEL® microspheres that are commercially available from Akzo Noble Industries (Duluth, Ga.), Dualite and Micropearl polymeric microspheres that are available from Pierce & Stevens Corporation (Buffalo, N.Y.), hollow plastic pigments that are available from Dow Chemical Company (Midland, Mich.), and the organic porous particles that are described in copending and commonly assigned U.S. Ser. Nos. 13/192,531 and 13/192,533, (both filed Jul. 28, 2011 by Landry-Coltrain and Nair) that are incorporated herein by reference.

Examples of plasticizers can include low molecular weight polyolefins, polyacrylates, polyesters, and fluorinated compounds (other than those described as essential components), silicone compounds, non-crosslinked liquid rubbers and oils, liquid ethylene-propylenes, liquid polybutylene, liquid polypropylene, or mixtures these materials.

Optional resins that can be incorporated in the laser-engraveable compositions or layers include but not limited to, commercial rubbers such as EPDM, SBR, NBR, commercial thermoplastic elastomers, such as Kraton™ SBS, SEBS, SIS products, copolymers of styrene and butadiene, copolymers of isoprene and styrene, styrene-butadiene-styrene block copolymers, styrene-isoprene-styrene copolymers, other polybutadiene or polyisoprene elastomers, nitrile elastomers, polychloroprene, polyisobutylene and other butyl elastomers, elastomers containing chlorosulfonated polyethylene, polysulfide, polyalkylene oxides, or polyphosphazenes, elastomeric polymers of (meth)acrylates, elastomeric polyesters, and other similar polymers known in the art. Still other useful elastomeric resins include vulcanized rubbers, such as Nitrile (Buna-N), Natural rubber, Neoprene or chloroprene rubber, silicone rubber, SBR (styrene-butadiene rubber), NBR (acrylonitrile-butadiene rubber), ethylene-propylene rubber, and butyl rubber. Particularly useful materials of this kind would be used in nano- or micro-particulate form.

Other optional resins are non-elastomeric resins including but not limited to, thermosetting or thermoplastic urethane resins that are derived from the reaction of a polyol (such as polymeric diol or triol) with a polyisocyanate or the reaction of a polyamine with a polyisocyanate, styrenic polymers, acrylate and methacrylate polymers and copolymers, olefinic polymers and copolymers, and epoxide polymers.

The laser-engraveable layer incorporated into the laser-engraveable patternable elements (such as flexographic printing precursors) of this invention has a dry thickness of at least 20 μm and up to and including 4,000 μm, or typically of at least 50 μm and up to and including 3,000 μm, or at least 300 μm and up to and including 3,000 μm.

For example, the total dry thickness of the entire laser-engraveable patternable elements, such as flexographic printing plate precursors, is generally at least 150 μm and up to and including 6,000 μm or typically at least 500 μm and up to and including 3,000 μm. Flexographic printing sleeve precursors can generally have a laser-engraveable layer having a dry thickness of at least 2 mm and up to and including 20 mm. Flexographic printing cylinders can have a suitable laser-engraveable layer dry thickness.

Multiple layers can be disposed one on top of the other in order to create a composite laser-engraveable layer. These multiple laser-engraveable layers can be identical in composition or thickness, or they can differ in composition in that they contain differing amounts and types of components (for example, thermoplastic elastomeric interpolymer alloys, near-infrared radiation absorbers, and optional components), or in thickness. For example, a laser-engraveable layer containing hollow microspheres or microbubbles can be disposed under an uppermost laser-engraveable layer that does not contain hollow microspheres. A skilled worker could design many different arrangements of such multiple laser-engraveable layers using the teaching provided herein.

While a single laser-engraveable layer is present in most flexographic printing precursors, there can be multiple laser-engraveable layers formed from the same or different laser-engraveable compositions having the same or different thermoplastic elastomeric interpolymer alloys. Thus, some embodiments comprise two or more layers including at least one laser-engraveable layer according to this invention. For example, there can be an additional or second laser-engraveable layer that is contiguous to a first laser-engraveable layer both of which laser-engraveable layers are prepared according to this invention (comprising the same or different thermoplastic elastomeric interpolymer alloy) and both layers can be laser-engraved at the same or different times.

In other embodiments, a non-laser engraveable layer can be arranged contiguous to a laser-engraveable layer according to the present invention comprising a thermoplastic elastomeric interpolymer alloy.

In still other embodiments, a thermoplastic elastomeric interpolymer alloy-containing laser-engraveable layer can be arranged contiguous to a different laser-engraveable layer that does not contain a thermoplastic elastomeric interpolymer alloy according to the present invention.

Other embodiments include alternating laser-engraveable layers according to this invention and non-laser-engraveable layers, for example such as a sandwich of at least three layers, such as a first laser-engraveable layer according to this invention, a non-laser-engraveable layer, and a second laser-engraveable layer according to this invention. A skilled worker in the art could design any number of alternative arrangements of suitable layers as embodiments of the present invention using the teaching of this disclosure.

In most embodiments, the laser-engraveable layer prepared according to this invention is the outermost layer of the laser-engraveable patternable elements, including embodiments where the laser-engraveable layer is disposed in a flexographic printing plate precursor or on a flexographic printing cylinder precursor as a sleeve. However, in some embodiments, the laser-engraveable layer can be located underneath an outermost capping smoothing layer that provides additional smoothness or different ink reception and release. This smoothing layer can have a general dry thickness of at least 1 μm and up to and including 200 μm.

The laser-engraveable patternable materials can optionally comprise an elastomeric rubber layer that is considered a "compressible" layer (also known as a cushioning layer) and is disposed over the substrate and under a laser-engraveable layer according to this invention. In most embodiments, the compressible layer is disposed directly on the substrate and the laser-engraveable layer is disposed directly on the compressible layer. While the compressible layer can be non-laser-engraveable, in some embodiments, the compressible layer comprises one or more components that also make it laser-engraveable (although not necessarily a thermoplastic elastomeric interpolymer alloy).

The compressible layer can also have microvoids or microspheres that are dispersed within the one or more elastomeric rubbers. Useful microspheres are described above as "microcapsules", "hollow beads", "hollow spheres", microbubbles", "micro-balloons", "porous beads", or "porous particles", which are dispersed (generally uniformly) within the one or more elastomeric rubbers in the compressible layer. The compressible layer can also comprise other addenda such as filler materials and addenda described above for the laser-engraveable layer.

The dry thickness of the compressible layer is generally at least 50 μm and up to and including 4,000 μm, or typically at least 100 μm and up to and including 2,000 μm.

The laser-engraveable patternable elements (such as laser-engraveable flexographic printing precursors) can have a suitable dimensionally stable, non-laser-engraveable substrate having an imaging side and a non-imaging side. The substrate has at least one laser-engraveable layer disposed over it on its imaging side. Suitable substrates include dimensionally stable polymeric films, high temperature polymeric films, chemically resistant films, aluminum sheets or cylinders, transparent foams, ceramics, glasses, porous glasses, fabrics, laminates of polymeric films (from condensation or addition polymers) and metal sheets such as a laminate of a polyester and aluminum sheet, polyester/polyamide laminates, or a laminate of a polyester film and a compliant or adhesive support. Polyester, polycarbonate, poly(vinyl chloride), and polystyrene films are typically used. Useful polyester substrates include but are not limited to films of poly(ethylene terephthalate) and poly(ethylene naphthalate). Other high temperature polymers useful as high temperature substrates include but are not limited to, polyetherimides, polyimides (such as Kapton™ films), poly(etheretherketone) (PEEK), polysulfone, polyethersulfone, polyphenylsulfone, and polyphenylenesulfide.

The substrate can have any suitable dry thickness, but generally it has a dry thickness of at least 0.01 mm or at least 0.05 mm and up to and including 5 mm.

Some other particularly useful substrates comprise one or more layers of a metal, fabric, or polymeric film, glass, porous glass, or ceramic used in combination. For example, a fabric web can be applied to a polyester or aluminum support using a suitable adhesive. For example, a fabric web can have a thickness of at least 0.1 mm and up to and including 0.5 mm, and the polyester support thickness can be at least 100 μm and up to and including 200 μm or the aluminum support can have a thickness of at least 200 μm and up to and including 400 μm. For example, a glass substrate can have a thickness of at least 100 μm and up to and including 5 mm. The dry adhesive thickness can be at least 10 μm and up to and including 300 μm.

A thin conductive layer or film of, for example, poly(3,4-ethylenedioxythiophene) (PEDOT), polyacetylene, polyaniline, polypyrrole, or other polythiophenes, indium tin oxide (ITO), or graphene, can be disposed between the substrate and a laser engraveable layer.

There can be a non-laser-engraveable backcoat on the non-imaging side of the substrate that can comprise a soft rubber or foam, or other compliant layer. This non-laser-engraveable backcoat can provide adhesion between the substrate and printing press rollers and can also provide extra compliance to the resulting laser-engraved patterned member, or for example to reduce or control the curl of a resulting laser-engraved patterned member. Alternatively, this backcoat can be laser-engraveable so as to provide the capability for writing specific information, product identification, classification, or other metadata on the backside while a relief image is on the imaging (imaged) side.

The laser engraveable patternable element (such as a laser-engraveable flexographic printing precursor) can be subjected to mechanical grinding by known methods in the art using commercially available machines such as belt grinders or cylindrical grinders using an abrasive wheel or abrasive paper. Grinding can be done on either the top surface of the imaging side of the patternable material or the bottom surface thereof, prior to the optional introduction of a support, in order to ensure thickness uniformity, or it can be done on the laser-engraveable layer surface to achieve a desired surface roughness that will improve ink wetting or transfer.

Preparation of Laser-engraveable Patternable Elements

Preparation of the laser-engraveable patternable elements of the present invention is illustrated as follows with respect to laser-engraveable flexographic printing precursors but other laser-engraveable patternable elements within the scope of this invention can be similarly prepared.

The laser-engraveable composition useful in the present invention can be prepared by melt-blending or melt-mixing the components used therein using any suitable mechanical mixing device known in the industry, such as for example a screw extruder, a Brabender mixer, a 2-roll or a 3-roll mill. Preferably, the polyolefin and the non-crosslinked halogenated polymer are initially mixed in the presence of a crosslinking agent specific to effect the partial crosslinking of the polyolefin, followed by mixing with the polyester. Alternately, the polyolefin can be crosslinked with a suitable crosslinking agent or irradiation prior to mixing with the halogenated polymer, and the polyester.

Suitable thermal crosslinking conditions can be used as one skilled in the art would know from the specific choice of the chemical crosslinking agent. For example, thermal curing can be achieved using infrared radiation or heating in an oven, a rotocure unit, in-line heating device, or a compounder or extruder. Various curing additives and accelerators can also be added to aid the partially crosslinking of the polyolefin. Other known crosslinking methods include, for example, electron beam irradiation and gamma irradiation.

The continuous laser-engraveable layer (for example, on a fabric web with the compressible layer) can then be laminated (or adhered) to a suitable substrate such as a polymeric film such as a polyester film to provide the laser-engraveable layer on a substrate, for example, a fabric web adhered with an adhesive to the polyester film. The continuous laser-engraveable layer can be ground using a suitable grinding apparatus to provide a uniform smoothness and thickness in the continuous laser-engraveable layer. The smooth, uniformly thick laser-engraveable layer can then be cut to a desired size to provide suitable laser-engraveable patternable elements of this invention, such as laser-engraveable flexographic printing precursors.

The process for making laser-engraveable flexographic printing sleeves is similar but the compounded laser-engraveable layer composition can be applied or deposited around a printing sleeve core, and cooled to form a continuous cylindrical laser-engraveable flexographic printing sleeve precursor.

Similarly, a continuous calendered laser-engraveable layer on a fabric web can be deposited around a printing cylinder and cooled to form a continuous flexographic printing cylinder precursor.

This process can be repeated as many times as desired to form two or more laser-engraveable layers over the substrate, which laser-engraveable layers can be contiguous, or any two laser-engraveable layers of this invention can be separated by intermediate layers that are either laser-engraveable or non-laser-engraveable, but which intermediate layers do not contain a thermoplastic elastomeric interpolymer alloy.

Surface Patterning Prior to Imaging

It is generally recognized that laser engravable flexographic plate precursors that are prepared using vulcanized rubbers require a surface grinding step during the manufacturing of such plates or sleeves. Surface grinding provides two advantages. The first is that it provides control over the printing plate or sleeve thickness uniformity and thickness. The second is that it provides a controlled surface roughness that enhances the printing quality of the member with flexographic inks. Although this grinding step can be included in the manufacturing workflow for the flexographic member, it has several disadvantages. It only provides a random surface structure. Control of the surface quality during grinding can be difficult. Extreme amounts of dirt from the ground surface can be generated and this can contaminate the flexographic plate precursor or other products in the plant. The rubber, which is elastomeric, must be attached to a non-elastic support that will provide mechanical stability during the grinding process. In addition, uncured, uncrosslinked, or un-vulcanized precursors cannot be successfully ground since these materials are too soft and will be deformed during the process, particularly since heat is generated at the interface between the grinding media and the precursor during the grinding process. Therefore photopolymer flexographic plate precursors cannot be subjected to surface grinding and their surfaces are typically very smooth. The imaged, photocrosslinked photopolymer could undergo surface grinding, however, it would be likely that the imaged features would be altered and damaged during the grinding process. The surface of thermoplastic elastomeric precursors may also succumb to melting and undesirable deformation during a grinding process.

It is also known that (U.S. Patent Application Publication 2010/0143841 of Stolt et al.) that providing a flexographic printing member with a specified surface micro-pattern can result in improved printing quality compared to that obtained with a smooth surface. However, the method used to create the patterned areas involved exposing the photopolymer precursor to radiation through an image mask to effect crosslinking in the exposed areas.

The topmost surface of the laser-engravable layer used in this invention cannot be readily roughened by grinding, nor patterned by photoimaging through a mask. Useful methods for controlling the topmost surface are direct laser ablation or surface embossing. These methods can be used to provide a specified roughness or to provide a micropattern on the topmost surface of a laser-engravable patternable element.

High resolution laser engravers, such as that described for LES2, can be used to laser-engrave (or image) a predetermined pattern into the topmost surface of the laser-engravable patternable element.

Embossing the topmost surface of the laser-engravable patternable element can be performed by any method known in the art. For example, the laser-engravable patternable element can be fed between 2 cylinders, where the cylinder that contacts the topmost surface has been pre-patterned or pre-embossed using any method known in the art, such as using a diamond stylus, a laser engraving, or a chemical etch. Heat and pressure of this assembly can be controlled so that only the topmost surface of the laser-engravable layer softens and replicates the exact features (peaks and valleys) of the pre-engraved or pre-embossed surface without causing melting and flowing of the laser-engraveable layer that would alter its macroscopic shape or dimension. Other methods include placing a pre-patterned film, element, matte film, roughened, ground, or etched metal surface, or a stamp, against the topmost surface of the laser-engravable layer and subjecting this assembly to heat and pressure in a mold, a molding press, or conveying it (roll-to-roll) through heated rollers or a laminator. The assembly is then cooled down to allow the laser-engravable layer to solidify, and the laser-engravable layer is removed from the mold, providing a patterned, laser-engravable surface. This can be performed while the laser-engravable patternable element is being shaped into a printing plate or printing cylinder form, or in a subsequent step.

Useful resulting patterns on the laser-engravable patternable element are checkerboard or repeat patterns with square, rectangular, circular, or oblong top shapes in the raised features. These raised shapes can have heights of at least 1 μm to and including 20 μm, or at least 1 μm to and including 15 μm, or more likely at least 1 μm to and including 5 μm. The raised shape height is defined as the difference between the topmost surface and the bottom of the valleys between the patterned features of the laser-engravable patternable element. Useful lateral dimensions of these surface features are at least 1 μm to and including 30 μm wide and at least 1 μm to and including 30 μm long, or at least 1 μm to and including 10 μm wide and 1 μm to 10 μm long. The repeat distance of the pattern can be at a higher frequency than that of the final relief image that will be engraved, with spacing (peak-to-peak) of at least 5 μm to and including 50 μm, or at least 5 μm to and including 35 μm. Additional patterns are described in U.S. Patent Application Publication 2010/0143841 (Stolt et al.) that is incorporated herein by reference.

In some embodiments, the laser-engraveable patternable element has an uppermost surface having a relief pattern with a relief image that has a depth of less than 10 μm and a repeat length in both horizontal directions of less than 20 μm.

Laser-Engraving for Imaging

Laser engraving can be accomplished using a near-IR radiation emitting diode or carbon dioxide or Nd:YAG laser. It is desired to laser engrave the one or more laser-engraveable layers to provide a relief image with a minimum relief image depth of at least 10 μm and up to and including 4,000 μm, or of at least 50 μm and up to and including 1,000 μm. For laser-engraveable flexographic printing members, more likely, the minimum relief image depth is at least 300 μm and up to and including 4,000 μm or up to and including 1,000 μm being more desirable. "Relief floor depth" is defined as the difference measured between the floor (lowest laser-engraved areas) of the laser-engraved patterned element and its outermost printing surface. It is to be understood that the relief image depth between image features (relief image depth, which is defined as the difference measured between the bottom of a specific laser-engraved area and its outermost printing surface) that are closely spaced will be less than the relief floor depth. The floor of the relief image can be the substrate if all layers are completely removed in the imaged regions. A semiconductor near-infrared radiation laser or one or more (array) of such lasers operating at a wavelength of at least 700 nm and up to and including 1400 nm can be used, and a diode laser operating at from at least 800 nm and up to and including 1250 nm is particularly useful for laser-engraving.

Imagewise exposing can also be carried out using one or more near-infrared radiation emitting lasers and the laser-engraveable layer can comprises a near-infrared radiation absorber.

Generally, laser-engraving is achieved using at least one near-infrared radiation laser having a minimum fluence level of at least 1 $J/cm^2$ at the element topmost and typically near-infrared imaging fluence is at least 10 $J/cm^2$ and up to and including 1,000 $J/cm^2$ or typically at least 50 $J/cm^2$ and up to and including 800 $J/cm^2$.

For example, laser-engraving can be carried out using a diode laser, an array of diode lasers connected with fiber optics, a Nd-YAG laser, a fiber laser, a carbon dioxide gas laser, or a semiconductor laser. Such instruments and conditions for their use are well known in the art and readily available from a number of commercial sources. Detailed descriptions can be found in U.S. Patent Application Publications 2010/0068470A1 (Sugasaki), 2008/018943A1 (Eyal et al.), and 2011/0014573A1 (Matzner et al.), all of which are hereby incorporated by reference.

A suitable laser engraver that would provide satisfactory engraving is described in WO 2007/149208 (Eyal et al.) that is incorporated herein by reference. This laser engraver is considered to be a "high powered" laser ablating imager or engraver and has at least two laser diodes emitting radiation in one or more near-infrared radiation wavelengths so that imaging with the one or more near-infrared radiation wavelengths is carried out at the same or different depths relative to the outer surface of the laser-engraveable layer. For example, the multi-beam optical head described in the noted publication incorporates numerous laser diodes, each laser diode having a power in the order of at least 5-10 Watts per emitter width of 100 μm. These lasers can be modulated directly at relatively high frequencies without the need for external modulators.

Thus, laser-engraving (laser imaging) can be carried out at the same or different relief image depths relative to the outer surface of the laser-engraveable layer using two or more laser diodes, each laser diode emitting near-infrared radiation in one or more wavelengths.

Other imaging (or engraving) devices and components thereof and methods are described for example in U.S. Patent Application Publications 2008/0153038 (Siman-Tov et al.) describing a hybrid optical head for direct engraving, 2008/0305436 (Shishkin) describing a method of imaging one or more graphical pieces in a flexographic printing plate precursor on a drum, 2009/0057268 (Aviel) describing imaging devices with at least two laser sources and mirrors or prisms put in front of the laser sources to alter the optical laser paths, and 2009/0101034 (Aviel) describing an apparatus for providing an uniform imaging surface, all of which publications are incorporated herein by reference. In addition, U.S. Patent Application Publication 2011/0014573 (Matzner et al.) describes an engraving system including an optical imaging head, a printing plate construction, and a source of imaging near-infrared radiation, which publication is incorporated herein by reference. U.S. Patent Application Publication 2011/0058010 (Aviel et al.) describes an imaging head for 3D imaging of flexographic printing plate precursors using multiple lasers, which publication is also incorporated herein by reference.

During imaging, products from the engraving can be gaseous or volatile and readily collected by vacuum for disposal or chemical treatment. Any solid debris from engraving can be collected and removed using suitable means such as vacuum, compressed air, brushing with brushes, rinsing with water, blotting with an absorbent material, ultrasound, or any combination of these.

During printing, the resulting flexographic printing plate, laser-engraved patterned element, flexographic printing cylinder, or flexographic printing sleeve is typically inked using known methods and the ink is appropriately transferred to a suitable receiver material such as papers, plastics, fabrics, paperboard, metals, particle board, wall board, glass, glass-coated substrates, ceramics, or cardboard.

After printing, the laser-engraved patterned element can be cleaned and reused in a suitable manner and reused as needed. Cleaning can be accomplished with compressed air, water, or a suitable aqueous or organic solution, or by rubbing with cleaning brushes or pads. Surfactants or soaps can be added to the aqueous or organic solutions to accelerate cleaning.

Printed patterns can be used in various industries to provide images, dots, text, and patterns of conductive or non-conductive lines, shapes, or areas. In addition, relief images can be provided and used in various articles for many different purposes. For example, the electronics, display, and energy industries rely on the formation of coatings and patterns of conductive materials to form circuits on various organic and inorganic substrates. Such coatings and patterns are often provided using relief imaging methods and relief image patternable elements.

Flexographic printing can be employed for printing on a variety of soft or easily deformed materials including but not limited to, paper, paperboard stock, corrugated board, polymeric films, fabrics, metal foils, glass, glass-coated materials, flexible glass materials, and laminates or multiple materials. The laser-engraveable flexographic printing precursors of this invention can also be used to provide patterns of fine lines.

Touch sensitive panels and other display devices require very fine line patterns to achieve high visual transparency. Printed patterns are formed on one or more surfaces of a suitable substrate. A variety of substrates can be patterned using the present invention including but not limited to, substrate materials comprising polymeric materials such as polyesters, acrylate polymers, polycarbonates, polyamides, polyimides, and polyolefins, cellulosic papers or resin-coated or glass-coated papers, glass or glass-containing composites, ceramics, metals such as aluminum, tin, and copper, and metalized films. Polyethylene terephthalate and polyethylene naphthalate are two useful polyesters that can be used as substrate materials.

The substrates can be surface-treated by exposure to corona discharge, mechanical abrasion, flame treatments, or oxygen plasmas, or by coating with various polymeric films, such as poly(vinylidene chloride) or an aromatic polysiloxane as described for example in U.S. Pat. No. 5,492,730 (Balaba et al.) and U.S. Pat. No. 5,527,562 (Balaba et al.) and U.S. Patent Application Publication 2009/0076217 (Gommans et al.).

Particularly useful substrates are polyesters such as poly (ethylene terephthalate) or poly(vinylidene chloride) films that have been surface-treated as noted above.

Any suitable ink can be used in the practice of this invention using the laser-engraved patterned elements, for example when the polarity of the substrate surface minus the polarity of the ink that is to be applied is less than or equal to 0.1, or typically less than or equal to 0.05. This difference in polarity, $\Delta$ (Polarity), is generally greater than or equal to $-0.15$ or typically greater than $-0.10$. A worker skilled in the art can choose a suitable ink for a given substrate surface (treated or non-treated).

Some particularly useful inks include but are not limited to, aqueous-based inks, solvent-based inks, UV-curable inks, and conductive inks containing conductive particles such as metal flakes or particles. Conductive inks include conductive silver-containing inks, gold-containing inks, copper-containing inks, carbon-containing inks, palladium-containing inks, and inks containing "seed" materials for electroplating or electroless plating. Some of such inks can be obtained commercially from sources such as InkTec (California), Flint Ink Corporation (Michigan), and Method Development Company (Chicago).

As inks, the dyes, pigments, or other particulate materials are dissolved or suspended in suitable solvents that are known in the art for this purpose. For example, a silver-containing conductive ink can include any useful amount of silver metal particles that are dispersed in aqueous or non-aqueous solvents.

Ink can be applied to the substrate surface using any suitable laser-engraved patterned element of this invention. In some embodiments, the method of this invention can be used to provide a printed pattern comprising lines having an average line width of less than 20 µm, or typically fine lines having an average line width of less than 15 µm and generally at least 3 µm. These average values can be determined by measuring the line width in randomly selected locations in images captured from optical micrographs of appropriate magnification.

In some of the embodiments, the method of this invention provides a printed pattern of fine lines containing a seed material for a subsequent electroless plating process. For example, for copper electroless plating, such seed materials include but are not limited to, metals such as palladium, tin, and silver, or a mixture of tin and palladium.

In other embodiments, the method of this invention can be used to provide a pattern of fine lines having an electrical conductivity that is high enough for a subsequent electroplating process. Such an electrical conductivity is at least 0.1 S/cm and the details of such processes are known in the art.

In still other embodiments, the method of this invention can be used to provide a pattern of fine lines composed of ink that is formulated to protect an underlying uniform metal film during a subsequent etching process. For example, the ink can be formulated to protect an underlying copper or silver film during a subsequent etching process.

The laser-engraved patterned element of this invention can have a relief image in the laser-engraved layer(s) comprising a predetermined pattern of relief lines, each line having an average width of at least 1 µM and up to and including 10 mm. Such lines can also have an average height of at least 10 µm and up to and including 4,000 µm. These average dimensions can be determined by measuring the lines in at least 10 places and determining the width or height using known image analysis tools including but not limited to, profilometry, optical microscopic techniques, atomic force microscopy, and scanning electron microscopy.

The laser-engraveable flexographic printing precursors of this invention can be part of a system that is designed for laser-engraving to form flexographic printing members. Besides such precursors, the system can include, at least, one or more laser-engraving radiation sources that are directed to provide laser engraving of the laser-engraveable layer. Useful laser-engraving sources are described above and additional sources would be readily apparent to one skilled in the art. One useful system is described in U.S. Patent Application Publication 2011/0014573 (noted above) that is incorporated herein by reference. Such laser-engraving system includes one or more laser-engraving radiation sources and particularly two groups of laser-engraving radiation sources when the precursor has two laser-engraveable layers.

The system can further comprise a platform on which the laser-engraveable flexographic printing precursor is mounted for laser-engraving. Such platforms can include for example, webs (moving or not moving), cylinders, or rotating drums. The laser-engraving radiation sources (for example, IR radiation sources) can be provided as one or more lasers for example from a hybrid optical imaging head having at least two groups of radiation sources as described for example in U.S. Patent Application Publication 2008/0153038 (Siman-Tov et al.), incorporated herein by reference, that are controlled using suitable control devices.

The one or more laser-engraving radiation sources can be selected from the group consisting of laser diodes, multi-emitter laser diodes, laser bars, laser stacks, fiber lasers, and a combination thereof. In particular embodiments, the laser-engraveable layer of the precursor comprises an infrared radiation absorber and the one or more laser-engraving radiation sources provide infrared radiation.

Other systems for providing relief images by laser-engraving are described for example in U.S. Pat. No. 6,150,629 (Sievers) and U.S. Pat. No. 6,857,365 (Juffinger et al.) and in U.S. Patent Application Publications 2006/0132592 (Sievers), 2006/0065147 (Ogawa), 2006/0203861 (Ogawa), and 2008/0153038 (noted above), 2008/018943A1 (noted above), and 2011/0014573A1 (noted above).

Recycling Processes

The present invention can also be used for recycling defective or used laser-engravable patternable elements or laser-engraved patterned elements prepared according to this invention. Such as a method for recycling can comprise:

melting a laser-engraveable layer of a laser-engraveable patternable material or a laser-engraved layer of a laser-engraved patterned member, the laser-engraveable layer or laser-engraved layer comprising a thermoplastic elastomeric interpolymer alloy that comprises:
a non-crosslinked halogenated polymer,
a partially crosslinked polyolefin, and
a polyester,
to form a melt, and
reforming the melt into a new laser-engravable patternable material.

Before or after printing or other use of the laser-engraved patterned element, it can be cleaned and reused (for example, a printing cylinder can be scraped or otherwise cleaned and reused) by recycling the laser-engraveable layer (before imaging) or laser-engraved layer (after imaging). For example, a laser-engraveable layer can be melted and recycled before it is engraved if there is an undesirable defect in the layer. Alternatively, it can be recycled after laser-engraving but before printing if the laser-engraving process creates an error or if there is a need for correction in the image.

Lastly, the laser-engraved layer can be recycled after a printing run is finished. Alternatively, a flexographic printing sleeve can be remolded and reshaped by melting the laser-engraved layer comprising the thermoplastic elastomeric interpolymer alloy to allow the imaged and non-imaged areas to merge and create a fresh uniform surface that will become a laser-engraveable patternable element when cooled. Optionally, this fresh surface can be ground, as described above. The fresh surface can then be exposed to laser engraving and the new relief image used for printing.

Before melting, the laser-engraveable layer or laser-engraved layer can be separated from all other layers and any substrate present in the laser-engraveable patternable element or laser-engraved patterned element.

The following representative method can be used to recycle or reuse a laser-engraved patterned element of the present invention:

1. Physically separating the layer containing the thermoplastic elastomeric interpolymer alloy described herein from the substrate and any other layers that are present and cleaning them to remove any residual ink or debris;

2. Chopping, cutting, or grinding the thermoplastic elastomeric interpolymer alloy into a form, such as small pieces or a powder, that is readily processable;

3. Feeding the small pieces or powder into a melt compounder or extruder, or other appropriate apparatus set to an appropriate processing temperature to form a melt; and 4. Extruding, calendering, or molding the melt into a new laser-engraveable patternable element.

Still another representative method that can be used to recycle or re-use a laser-engraved flexographic printing sleeve of this invention comprises:

1. Mounting the used flexographic printing sleeves on a suitable rotating holder and cleaning the surface to remove any residual ink or debris;

2. Scraping or shaving off, for example as the unit rotates to ensure uniformity, the desired amount of the outer layer of the thermoplastic elastomeric interpolymer alloy composition;

3. Collecting the removed material and feeding it into a melt compounder or extruder, or other appropriate apparatus set to an appropriate processing temperature to form a melt;

4. Extruding the melt into a new laser-engraveable flexographic printing precursor, or onto a used, scraped flexographic printing sleeve; and 5. Optionally grinding, molding, or embossing the new surface to provide a desired surface roughness and uniform thickness of the resulting laser-engraveable flexographic sleeve precursor.

Still another method for recycling or re-using a laser-engraved flexographic printing sleeve of this invention comprises:

1. Mounting a used flexographic printing sleeve onto a suitable rotating holder and cleaning the surface to remove any residual ink or debris;

2. Heating the outer layer of the thermoplastic elastomeric interpolymer alloy layer of the flexographic printing sleeve to melt the laser-engraved features;

3. Reshaping the outer surface of the resulting laser-engraveable flexographic printing sleeve using heat to form a smooth uniform surface; and 4. Optionally grinding, molding, or embossing the new surface to provide a desired surface roughness and uniform thickness of the laser-engraveable flexographic printing sleeve precursor.

Equipment that can be used to effect the steps of the recycling method described above include, but are not limited to, single-screw extruders, twin-screw extruders, extruders equipped with dies, Brabender compounders, injection molders, calendering units, single or twin screw augers, compounding extrusion units, pelletizing units, sheet extrusion units, chopping and regrinding units.

Thus, in some embodiments of this invention, a method for recycling comprises:

melting a laser-engraveable layer of a laser-engraveable patternable element or a laser-engraved layer of a patterned element, the laser-engraveable layer or laser-engraved layer comprising a thermoplastic elastomeric interpolymer alloy that comprises:
a non-crosslinked halogenated polymer,
a partially crosslinked polyolefin, and
a polyester,
to form a melt, and
reforming the melt into a new laser-engravable patternable element.

In some of such embodiments, the non-crosslinked halogenated polymer is present in the laser-engraveable layer or laser-engraved layer in an amount of at least 5 weight % and up to and including 75 weight %, based on the total dry weight of the laser-engraveable layer or laser-engraved layer.

It is also possible that the partially crosslinked polyolefin is present in the laser-engraveable layer or laser-engraved layer in an amount of at least 5 weight % and up to and including 90 weight %, based on the total dry weight of the laser-engraveable layer or laser-engraved layer.

Moreover, the polyester can be present in the laser-engraveable layer or laser-engraved layer in an amount of at least 5 weight % and up to and including 90 weight %, based on the total dry weight of the laser-engraveable layer or laser-engraved layer.

In some embodiments, the weight ratio of the non-crosslinked halogenated polymer to the partially crosslinked polyolefin in the laser-engraveable layer or the laser-engraved layer is at least 0.05:1 to and including 3:1.

Moreover, the thermoplastic elastomeric interpolymer alloy can have a softening temperature of less than or equal to 10° C.

The laser-engraveable layer or laser-engraved layer can further comprise a near-infrared radiation absorber in an amount of at least 0.5 weight %, which near-infrared radiation absorber is a carbon black, carbon nanotubes, an inorganic or organic pigment, an organic dye having at least one absorption peak wavelength of at least 700 nm to and including 1400 nm, or a combination of any of these materials.

The recycling method can include melting a laser-engraveable layer of a flexographic printing precursor, or melting a laser-engraved layer of a flexographic printing member.

In some embodiments, the laser-engraveable patternable element or patterned element further comprises a substrate on which the laser-engravable layer or laser-engraved layer is disposed before recycling.

The cycling method of claim 1 can further comprise:
before melting, separating the laser-engraveable layer or laser-engraved layer from all other layers and any substrate present in the laser-engraveable patternable element or patterned element.

The present invention provides at least the following embodiments and combinations thereof, but other combinations of features are considered to be within the present invention as a skilled artisan would appreciate from the teaching of this disclosure:

1. A laser-engravable patternable element for providing a relief image, the laser-engraveable patternable element comprising at least one laser-engravable layer that comprises a thermoplastic elastomeric interpolymer alloy that comprises:
a non-crosslinked halogenated polymer,
a partially crosslinked polyolefin, and
a polyester.

2. The laser-engraveable patternable element of embodiment 1, wherein the non-crosslinked halogenated polymer is present in the laser-engraveable layer in an amount of at least 5 weight % and up to and including 75 weight %, based on the total dry weight of the laser-engraveable layer.

3. The laser-engraveable patternable element of embodiment 1 or 2, wherein the partially crosslinked polyolefin is present in the laser-engraveable layer in an amount of at least 5 weight % and up to and including 90 weight %, based on the total dry weight of the laser-engraveable layer.

4. The laser-engraveable patternable element of any of embodiments 1 to 3, wherein the polyester is present in the laser-engraveable layer in an amount of at least 5 weight % and up to and including 90 weight %, based on the total dry weight of the laser-engraveable layer.

5. The laser-engraveable patternable element of any of embodiments 1 to 4, wherein the weight ratio of the non-crosslinked halogenated polymer to the partially crosslinked polyolefin in the laser-engraveable layer is at least 0.05:1 to and including 3:1.

6. The laser-engraveable patternable element of any of embodiments 1 to 5, wherein the thermoplastic elastomeric interpolymer alloy has a softening temperature of less than or equal to 10° C.

7. The laser-engraveable patternable element of any of embodiments 1 to 6, wherein the laser-engraveable layer further comprises a near-infrared radiation absorber in an amount of at least 0.5 weight %, which near-infrared radiation absorber is a carbon black, carbon nanotubes, an inorganic or organic pigment, an organic dye having at least one absorption peak wavelength of at least 700 nm and to and including 1400 nm, or a combination of any of these materials.

8. The laser-engraveable patternable element of any of embodiments 1 to 7 comprising multiple layers including at least one laser-engraveable layer.

9. The laser-engraveable patternable element of any of embodiments 1 to 8 further comprising a non-laser-engraveable layer that is contiguous to the laser-engraveable layer.

10. The laser-engraveable patternable element of any of embodiments 1 to 9 further comprising a substrate over which the laser-engraveable layer is disposed.

11. The laser-engraveable patternable element of any of embodiments 1 to 10, wherein the laser-engraveable layer has a dry average thickness of at least 20 μm and up to and including 4,000 μm.

12. The laser-engraveable patternable element of any of embodiments 1 to 11 that is a flexographic printing precursor, gravure printing precursor, or intaglio printing precursor.

13. The laser-engraveable patternable element of any of embodiments 1 to 12, wherein its uppermost surface has a relief pattern with a relief image that has a depth of less than 10 μm and a repeat length in both horizontal directions of less than 20 μm.

14. A method for providing a relief image in a directly laser-engraved patterned element using direct laser engraving, the method comprising:
imagewise exposing the laser-engraveable patternable element of any of embodiments 1 to 13 to laser-engraving radiation to provide a directly laser-engraved patterned element having a relief image in the laser-engraveable layer.

15. The method of embodiment 14 to provide a relief image in a flexographic printing member, comprising:

laser-engraving the laser-engraveable patternable element that is a flexographic printing precursor, to provide a flexographic printing member having a relief image in the laser-engraveable layer, the relief image having a minimum relief image depth of at least 30 μm.

16. The method of embodiment 14 or 15, comprising imagewise exposing using one or more near-infrared radiation emitting lasers and the laser-engraveable layer further comprises a near-infrared radiation absorber.

17. The method of any of embodiments 14 to 16, further comprising:
using the directly laser-engraved patterned element to print an ink pattern.

18. The method of any of embodiments 14 to 17 for providing a flexographic printing member having the relief image in the laser-engraveable layer, and further comprising using the flexographic printing member to print a flexographic ink image.

19. The method of any of embodiments 14 to 18, further comprising:
applying an ink to the directly laser-engraved patterned element having a relief image that has a minimum relief image depth of at least 10 μm, to form an inked patterned element, and
contacting the inked patterned element with a receiver element to form an ink image on the receiver element that corresponds to the relief image.

20. The method of any of embodiments 14 to 17, wherein the laser-engraveable patternable element is a gravure or intaglio printing precursor, the method comprising:
directly laser-engraving the laser-engraveable layer of the gravure or intaglio printing precursor to provide a recessed relief image having a minimum relief depth of at least 10 μm in the resulting laser-engraved gravure or intaglio printing member.

The following Examples are provided to illustrate the practice of this invention and are not meant to be limiting in any manner.

Laser Engraving Systems:

Laser Engraving System LES1:

A first engraving system included using a 5.3 watt, 1064 nm pulsed single mode ytterbium fiber laser with an 80 μm spot size. The pulse width was approximately 30 nsec and the pulse repetition rate was 20 kHz. The image contained 1 cm×1 cm patches that were rastered at 800 dpi using laser beam speeds of from 13 to 6.5 inch/sec (33.02 to 16.5 cm/sec) resulting in corresponding fluences of from 51 J/cm$^2$ to 102 J/cm$^2$. The depths of the ablated patches were measured using a self non-rotating spindle using a ratchet stop micrometer. The quality of the imaged features, presence of melt edges, and the amount and severity of redeposition of the ablation debris were determined visually and using an optical microscopy and scanning electron microscopy (SEM).

Laser Engraving System LES2:

A second engraving system included using a continuous wave (CW) laser operating in the 830 nm range at 25 Watts in 960 channels. The laser beam has a 3 μm spot size (Kodak SQUAREspot® technology) at optimum focus. The sample was mounted on flat plate that moves in the Y (fast scan) direction while the laser head moves on an air bearing in the X (slow scan) direction. Pixel placement was on 2 μm centers corresponding to an addressability of 12,800 dpi. The ablation sensitivity value for the plate material was calculated by dividing the combined fluence for the 3 sequential engraving passes by the measured relief (in μm) that resulted from these engravings. When imaging at 0.2 in/sec, this fluence was calculated to be 19.7 J/cm$^2$ for the sum of the 3 passes. Unless other specified, these were the conditions used in the examples below. The resulting relief image after engraving was evaluated using the Tencor P10 Surface Profilometer. The quality of the imaged features, presence of melt edges, and the amount and severity of redeposition of the ablation debris were determined visually and using an optical microscopy and scanning electron microscopy (SEM).

Laser Engraving System LES3:

A third engraving system included using a multiplicity of fiber-coupled laser diodes (approximately 10 Watts each) emitting at about 915 nm to engrave a sample assembly that was mounted onto a rotating drum at a resolution of 150 lpi (lines per inch, or 381 lines per cm). The quality of the imaged features, presence of melt edges, and the amount and severity of redeposition of the ablation debris were determined visually and using an optical microscopy and scanning electron microscopy (SEM).

INVENTION EXAMPLE IE1

Thermoplastic elastomeric interpolymer alloy pellets (3.5 g, Alcryn® 2070BK containing 7 weight % of carbon black and 39 weight % of chlorine from Advanced Polymer Alloys) were introduced into an aluminum mold with a sheet of 300FN Kapton™ on one side for ease of release, and were pressed into the shape of a flat plate using a Carver press (model #3393) set at 3000 lbs (1360.8 kg) at 190° C. for 5 minutes. The assembly of the mold and its contents were removed and then cold-pressed in another Carver press that was set at 3000 lbs (1360.8 kg) with no heating for 30 minutes. The resulting laser-engraveable flexographic printing precursor (or laser-engraveable patternable element) was 75×75 mm in size and approximately 0.8 mm thick. This precursor was laser engraved using LES1 and the relief image depth obtained at the laser fluence of 102 J/cm$^2$ was 227 μm. The precursor was further laser engraved using LES2 (at the stated fluence of 19.7 J/cm$^2$] and the relief image depth laser was determined to be 48 μm. The edges of the laser engraved features were sharp, showing no melt edges and the laser engraved flexographic printing member was very clean, showing no redeposition of ablation debris sticking to the laser engraved relief image.

INVENTION EXAMPLE IE2

Thermoplastic elastomeric interpolymer alloy pellets (Alcryn® 4670BK containing 0.5 weight % of carbon black and 35 weight % of chlorine from Advanced Polymer Alloys) were introduced into an aluminum mold with a sheet of 300FN Kapton™ on one side for ease of release, and were pressed into the shape of a flat plate using a Carver press (model #3393) set at 3000 lbs (1360.8 kg), at 190° C. for 5 minutes. The assembly of the mold and its contents were then cold-pressed in another Carver press that was set at 3000 lbs (1360.8 kg) with no heating for 30 minutes. The resulting laser-engraveable flexographic printing precursor (or laser-engraveable patternable element) was 75×75 mm in size and approximately 0.8 mm thick. This precursor was laser engraved using LES1 and the relief image depth when the laser fluence was 102 J/cm$^2$ was 301 μm. This precursor was further laser engraved using LES2 and the relief image depth was determined to be 45 μm. The edges of the laser engraved features were sharp, showing no melt edges. Minor amounts of debris were re-deposited onto the relief image and element.

INVENTION EXAMPLE IE3

Thermoplastic elastomeric interpolymer alloy pellets (36 g, Alcryn® 4670BK containing 0.5 weight % of carbon black and 35 weight % of chlorine from Advanced Polymer Alloys) were combined with carbon black powder (2 g, Mogul® L from Cabot Corporation, Boston, Mass.) and melt mixed in a Brabender mixer (ATR-2120 equipped with 3 heat zones and high shear roller type blades) at 185° C. for 6 minutes, removed from the mixer, and allowed to cool. This resulted in a 94.8 weight % of Alcryn® and 5.2 weight % of carbon black. A sample (3.5 g) of this mixture was introduced into an aluminum mold with a sheet of 300FN Kapton™ on one side for ease of release, and was pressed into the shape of a flat plate using a Carver press (model #3393) set at 3000 lbs (1360.8 kg), at 190° C. for 5 minutes. The assembly of the mold and its contents were then cold-pressed in another Carver press that was set at 3000 lbs (1360.8 kg) with no heating for 30 minutes. The resulting laser-engraveable flexographic printing precursor (laser-engraveable patternable element) was 75×75 mm in size and approximately 0.8 mm thick.

INVENTION EXAMPLE IE4

Thermoplastic elastomeric interpolymer alloy pellets (40 g, Alcryn® 2080BK containing 8 weight % of carbon black and 36 weight % of chlorine from Advanced Polymer Alloys) were combined with carbon black powder (2 g, Mogul® L from Cabot Corp Boston, Mass.) and 2 g of M5 Silica and melt mixed in a Brabender mixer (ATR-2120 equipped with 3 heat zones and high shear roller type blades) at 185° C. for 6 minutes, removed from the mixer, and allowed to cool. This resulted in a composition that contained a total of 11.8 weight % of carbon black and 4.6 weight % of silica. A sample (3.5 g) of this mixture was introduced into an aluminum mold with a sheet of 300FN Kapton™ on one side for ease of release, and was pressed into the shape of a flat plate using a Carver press (model #3393) set at 3000 lbs (1360.8 kg), at 190° C. for 5 minutes. The assembly of the mold and its contents were then cold-pressed in another Carver press that was set at 3000 lbs (1360.8 kg) with no heating for 30 minutes. The resulting laser-engraveable flexographic printing precursor (laser-engraveable patternable element) was 75×75 mm in size and approximately 0.8 mm thick. A portion of this flexographic printing precursor was reground under cryo-temperature conditions using liquid nitrogen, and then extruded using a ThermoHaake twin screw extruder (Model MiniLab Rheomix CTW5) at 185° C. for 10 minutes at 60 rpm, flushed from the extruder, and allowed to cool. Thin slices were taken and examined by optical microscopy, showing a uniform mixing of components. This example illustrates that the laser-engraveable flexographic printing precursor was readily reprocessed and recycled into a new precursor.

INVENTION EXAMPLE IE5

A sample (3.5 g) of the thermoplastic elastomeric interpolymer alloy pellets (Alcryn® 2080BK containing 8 weight % of carbon black and 36 weight % of chlorine from Advanced Polymer Alloys) was introduced into an aluminum mold with a sheet of 300FN Kapton™ on one side for ease of release, and was pressed into the shape of a flat plate using a Carver press (model #3393) set at 3000 lbs (1360.8 kg), at 190° C. for 5 minutes. The assembly of the mold and its contents were removed and then cold-pressed in another Carver press that was set at 3000 lbs (1360.8 kg) with no heating for 30 minutes. The resulting laser-engraveable flexographic printing precursor (laser-engraveable patternable element) was 75×75 mm in size and approximately 0.8 mm thick. This precursor was laser engraved using LES1 and the relief image depth engraved when the laser fluence was 102 J/cm$^2$ was 164 µm. This precursor was further laser engraved using LES2 and the relief image depth was determined to be 46 µm. The edges of the engraved precursor features were sharp, showing no melt edges, and the laser-engraved relief image and element were very clean, showing no re-deposition of debris sticking to them.

INVENTION EXAMPLE IE6

A continuous roll of flexographic printing plate precursor was prepared by melt extruding, using a multi-purpose extruder (MPX), the thermoplastic elastomeric interpolymer alloy (TEIA) pellets (Alcryn® 2080BK containing 8 weight % of carbon black and 36 weight % of chlorine from Advanced Polymer Alloys). Twin screw extruders were used to feed the TEIA into a multiport temperature controlled 3 layer 7 inch (17.8 cm) EDI die with a 0.050 inch (0.13 cm) lip gap and the material was extruded onto a moving web of 125 µm thick polyethylene terephthalate (PET) substrate that had been coated with a primer layer that comprised a vinylidene chloride/acrylonitrile/acrylic acid terpolymer, as referred to in U.S. Pat. No. 5,695,920 (Anderson et al.). The TEIA/PET package was continuously taken up on a roller. The barrel zone 1 temp was 340° F. (188° C.), barrel zone 2&3 was 360° F. (182° C.) barrel zone 4, gate, adapter, polyline and die were at 370° F. (188° C.) on the MPX, and the thickness of the TEIA/PET package was varied between 425 and 1040 µm. The resulting laser-engraveable flexographic printing precursor (laser-engraveable patternable element) was laser engraved using LES2 and the relief image depth was determined to be 42 µm. The edges of the laser engraved features were sharp, showing no melt edges and the laser-engraved relief image and element were very clean, showing no redeposition of debris.

INVENTION EXAMPLE IE7

A laser-engravable element like Invention Example IE5 was prepared as noted above, except that the resulting size was 12 cm×20 cm by 0.8 mm thick. This precursor was laminated to a 0.265 mm thick PET [poly(ethylene terephthalate)] support with an adhesive layer on one side. The resulting assembly was mounted onto a rotating drum and was laser-engraved using LES3. The resulting imaged flexographic printing plate (flexographic printing member) was used for printing to a polyethylene film using a flexographic printing press (Comco Cadet 700) and a solvent-based cyan ink from Sun Chemical Corporation. The laser engraved flexographic printing plate showed excellent feature quality with no debris sticking to the relief image. After 5000 km of printing, both positive and negative images remained sharp. Vertical and horizontal 50 µm wide lines remained continuous and straight.

INVENTION EXAMPLE IE8

A laser-engravable element was prepared like Invention Example IE5 as above and was laser engraved using the LES2, except that the precursor was imaged using 15 sequential laser engraving passes at a speed of 0.2 msec. The resulting flexographic printing plate showed no image degradation or distortion, the relief image had sharp edges, showing no melt edges, and no debris sticking to it, even after undergoing a very high number of sequential engraving passes, having an overall relief image depth of 227 µm.

COMPARATIVE EXAMPLE CE1

Polypropylene (Isotactic, $M_n$=250,000, Product #182389 from Sigma-Aldrich St. Louis, Mo.) was combined with carbon black powder (Mogul® L from Cabot Corporation, Boston, Mass.) in a weight ratio of 93:7 and melt mixed in a Brabender mixer (ATR-2120 equipped with 3 heat zones and high shear roller type blades) at 185° C. for 6 minutes, removed from the mixer, and allowed to cool. A sample (3.5 g) of this mixture was introduced into an aluminum mold and pressed as described for Invention Example IE1 at a temperature of 200° C. and 5000 lbs (2268.0 kg), and then cold pressed. The resulting laser-engraveable flexographic printing precursor was 75×75 mm in size and approximately 0.8 mm thick. This precursor was laser engraved using LES1 and the relief image depth that was laser engraved at a fluence of 102 J/cm$^2$, was 207 µm. The resulting flexographic printing member was very hard and did not show elastomeric properties. In addition, severe melt edges were observed at the edges of features in the relief image.

COMPARATIVE EXAMPLE CE2

A styrene-butadiene triblock copolymer TPE (4.7 g, Kraton™ D1102K with 28% polystyrene content from Kraton Polymers LLC, Houston, Tex.) was combined with carbon black powder (0.3 g, Mogul® L from Cabot Corp Boston, Mass.) and melt mixed in a ThermoHaake twin screw extruder (Model MiniLab Rheomix CTW5) at 190° C. for 5 minutes at 60 rpm, flushed from the extruder, and allowed to cool. This resulted in 94 weight % of Kraton and 6 weight % of carbon black. A sample (3.5 g) of this mixture was melt molded as described for Invention Example IE1 and laser engraved using LES1, and the relief image depth when laser-engraved at a fluence of 102 J/cm$^2$ was 227 µm. However, the relief image showed melt edges. This precursor was further laser-engraved using LES2 and the relief image depth was determined to be 58 µm. However, the relief image showed melt edges.

COMPARATIVE EXAMPLE CE3

Santoprene™ 111-73 (a thermoplastic vulcanizate consisting of vulcanized EPDM rubber micro-dispersed in a polyolefin, from ExxonMobil Chemical Company, TX) was melt-compounded with a carbon black concentrate (PolyOne® 1120 Black PEC Black, a 50% carbon loading in LDPE, from PolyOne, OH) to provide a final composition of 5 weight % of carbon in the thermoplastic vulcanizate, and injection molded at temperatures of 400-420° F. (204-232° C.) to provide square-shaped precursor samples that were 5 inch (12.7 cm) long×5 inch (12.7 cm) wide and 1.02-1.05 mm thick. The flexographic printing precursor was laser engraved using LES1 and further laser engraved using LES2. It was not possible to determine accurate depth values for the relief image due to the poor quality of the laser-engraving and resulting relief image features. The small 2% dots were not formed, and the relief image features were not well defined and did not have sharp edges. Melt edges and laser plowing were visible and sticky debris was re-deposited onto the relief image.

COMPARATIVE EXAMPLE CE4

Sarlink® 3140 polypropylene elastomer blend thermoplastic vulcanizate (obtained from DSM Thermoplastic Elastomers, Inc., MA) was melt-compounded with carbon concentrate PolyOne® 1120 Black PEC Black as described above for Comparative Example CE3 to provide a final composition of 5 weight % of carbon in the thermoplastic vulcanizate, and injection molded at temperatures near 420° F. (216° C.) to provide square-shaped precursor samples that were 5 inch (12.7 cm) long, 5 inch (12.7 cm) wide, and 1.02-1.05 mm thick. The laser-engraveable patternable element was laser engraved using LES1 and further laser engraved using LES2. It was not possible to determine accurate relief image depths due to the poor quality of the laser engraving and the relief image features. The small 2% dots were not formed, and the relief image features were not well defined and did not have sharp edges. Melt edges and laser plowing were visible and sticky debris was re-deposited onto the relief image.

COMPARATIVE EXAMPLE CE5

DuPont™ ETPV 60A01L (an engineering thermoplastic vulcanizate consisting of highly crosslinked vulcanized modified ethylene-acrylic rubber microdispersed in a copolyester matrix, from DuPont, DE) was melt-compounded with carbon concentrate Hytrel® Carbon Concentrate (from Clariant, N.C.) as described for Comparative Example CE3 to provide a final composition of 5 weight % carbon in the thermoplastic vulcanizate, and injection molded at temperatures of 245-255° C. to provide square-shaped laser-engraveable patternable element samples that were 5 inch (12.7 cm) long, 5 inch (12.7 cm) wide, and 1.02-1.05 mm thick. The patternable element was laser engraved using LES1 and further laser engraved using LES2. It was not possible to determine accurate relief image depths due to the poor quality of the laser-engraving and the relief image features. Most small and medium size dots and relief image features were very poorly defined. Extreme melt edges were observed.

INVENTION EXAMPLE IE9: Gravure Element

Laser-engraveable patternable element IE5 was laser engraved using a LES2. The patterns used were either 10 µm wide lines that were 44 µm deep or 43 µm wide lines that were 44 µm deep arranged to cross in a diamond shaped pattern, to form a grid pattern in a gravure patternable element. The resulting patterned element was flooded with cyan solvent based ink (Flint Thermogloss Cyan) and the excess ink was skived off using a metal doctor blade, leaving the laser-engraved troughs filled with ink. The patterned element was then pressed onto paper receivers with various pressures to form printed images. The printed image line widths were of the same width as the laser-engraved troughs in the plate, and exhibited sharp and well defined edges.

INVENTION EXAMPLE IE10: Recycling Method

To demonstrate how this patterned elements of this invention can be recycled, a flexographic printing member obtained from Invention Example IE5 (laser engraved using LES2) was cut into 5-10 mm size pieces using scissors. These pieces were then melt-molded in the press as described in Invention Example IE1. The resulting laser-engraveable printing precursors were 75×75 mm in size and approximately 0.8 mm thick. The laser-engraveable flexographic printing precursor (laser-engraveable patternable element) formed from this recycled material was laser-engraved using LES2, as described above. The relief image depth formed under the noted conditions was 44 µm, a similar relief depth as obtained for the non-recycled precursor of Example IE5.

The edges of the laser engraved relief image features were sharp, showing no melt edges, and the relief image was very clean, showing no re-deposition of debris onto the relief image and element.

INVENTION EXAMPLE IE11

Surface Patterning Prior to Laser-Engraving

Laser-engraveable Invention Example IE6, having a laser-engraveable layer on poly(ethylene terephthalate) with a total (TEIA/PET) thickness of 425 µm, was embossed by heat and pressure [using a Carver press (model #3393) set at 2000 lbs (907.2 kg) at 160° C. for 45 seconds] against a commercially available Flexcel™ NX (Kodak) flexographic printing plate having a surface relief pattern consisting of hemisphere-shaped depressions of 4 µm diameter and 2.6 µm deep, spaced 10 µm apart (center-to-center) as determined by a Veeco NT8000 system. This resulted in Invention Example IE5 laser-engraveable patternable element having a surface pattern having raised hemispheres (the mirror or inverse image) of the same size and spacing as above. A full relief image at a lower repeat frequency was then laser-engraved into this surface-patterned laser-engravable precursor using LES2. This fully laser engraved patterned element was then used to print impressions on paper receivers (KPP-Proofing paper) using a benchtop K Printing Proofer (Testing Machines Inc. DE) and an aqueous cyan ink (HMR50080-473 process cyan from Flint, Minn.) using a 150 lpi Anilox plate.

INVENTION EXAMPLE IE12

Surface Patterning Prior to Laser-Engraving

Another surface pattern was obtained by laser engraving another portion of Invention Example IE5 using LES2. The micro-surface pattern used was a checkerboard pattern of 30 µm wide×30 µm long spots, each engraved to a depth of 13 µm. The surface patterned laser-engraved patternable element was then laser engraved to form a relief image using LES2 at a lower frequency of repetition.

The examples described above demonstrate that the thermoplastic elastomeric interpolymer alloy described for use in the present invention provides a unique required combination of properties for high precision laser-engravable patternable elements, providing excellent engraved image quality, absence of melt edges, laser-engraveable cleanliness, and no re-deposition of debris onto the relief images, compared to the comparative laser-engraveable patternable elements.

The invention has been described in detail with particular reference to certain preferred embodiments thereof, but it will be understood that variations and modifications can be effected within the spirit and scope of the invention.

The invention claimed is:

1. A laser-engravable patternable element for providing a relief image, the laser-engraveable patternable element comprising at least one laser-engravable layer that comprises a thermoplastic elastomeric interpolymer alloy that comprises:
   a non-crosslinked halogenated polymer,
   a partially crosslinked polyolefin,
   a polyester, and
   a near-infrared radiation absorber in an amount of at least 5 weight % and up to and including 30 weight %, based on the total dry laser-engraveable layer weight.

2. The laser-engraveable patternable element of claim 1, wherein the non-crosslinked halogenated polymer is present in the laser-engraveable layer in an amount of at least 5 weight % and up to and including 75 weight %, based on the total dry weight of the laser-engraveable layer.

3. The laser-engraveable patternable element of claim 1, wherein the partially crosslinked polyolefin is present in the laser-engraveable layer in an amount of at least 5 weight % and up to and including 90 weight %, based on the total dry weight of the laser-engraveable layer.

4. The laser-engraveable patternable element of claim 1, wherein the polyester is present in the laser-engraveable layer in an amount of at least 5 weight % and up to and including 90 weight %, based on the total dry weight of the laser-engraveable layer.

5. The laser-engraveable patternable element of claim 1, wherein the weight ratio of the non-crosslinked halogenated polymer to the partially crosslinked polyolefin in the laser-engraveable layer is at least 0.05:1 to and including 3:1.

6. The laser-engraveable patternable element of claim 1, wherein the thermoplastic elastomeric interpolymer alloy has a softening temperature of less than or equal to 10° C.

7. The laser-engraveable patternable element of claim 1, wherein the near-infrared radiation absorber is a carbon black, carbon nanotubes, an inorganic or organic pigment, an organic dye having at least one absorption peak wavelength of at least 700 nm and to and including 1400 nm, or a combination of any of these materials.

8. The laser-engraveable patternable element of claim 1 comprising two or more layers including at least one laser-engraveable layer.

9. The laser-engraveable patternable element of claim 1 further comprising a non-laser-engraveable layer that is contiguous to the laser-engraveable layer.

10. The laser-engraveable patternable element of claim 1 further comprising a substrate over which the laser-engraveable layer is disposed.

11. The laser-engraveable patternable element of claim 1, wherein the laser-engraveable layer has a dry average thickness of at least 20 µm and up to and including 4,000 µm.

12. The laser-engraveable patternable element of claim 1 that is a flexographic printing precursor, gravure printing precursor, or intaglio printing precursor.

13. The laser-engraveable patternable element of claim 1, wherein its uppermost surface has a relief pattern with a relief image that has a depth of less than 10 µm and a repeat length in both horizontal directions of less than 20 µm.

14. A directly laser-engraved patterned element having a relief image provided by direct laser-engraving, the directly laser-engraved patterned element comprising the relief image that has a depth of at least 10 µm in a directly laser-engraved layer comprising a thermoplastic elastomeric interpolymer alloy comprising:
   a non-crosslinked halogenated polymer,
   a partially crosslinked polyolefin,
   a polyester, and
   a near-infrared radiation absorber in an amount of at least 5 weight % and up to and including 30 weight % based on the total directly laser-engraved layer weight,
   wherein the relief image in the directly laser-engraved layer comprises features that have an average line width of at least 1 µm and up to and including 10 mm with no melt edges.

15. A directly laser-engraved patterned element comprising a directly laser-engraved layer having a relief image, the directly laser-engraved layer comprising a recycled thermoplastic elastomeric interpolymer alloy comprising:
   a non-crosslinked halogenated polymer,
   a partially crosslinked polyolefin,
   a polyester, and a near-infrared radiation absorber in an amount of at least 5 weight % and up to and including 30 weight % based on the total directly laser-engraved layer weight, wherein the relief image in the directly laser-engraved layer comprises features that have an average line width of at least 1 µm and up to and including 1 mm with no melt edges.

* * * * *